United States Patent [19]
Caruolo et al.

[11] 3,860,889
[45] Jan. 14, 1975

[54] STABLE PLATFORM STRUCTURE FOR LASER OPTICS

[75] Inventors: Antonio B. Caruolo, Vernon; Jack W. Davis, East Hartford, both of Conn.

[73] Assignee: United Aircraft Corporation, East Hartford, Conn.

[22] Filed: Dec. 26, 1973

[21] Appl. No.: 427,959

[52] U.S. Cl............... 331/94.5 R, 330/4.3, 248/20, 248/21, 248/358 R, 331/94.5 D
[51] Int. Cl.......................... H01s 3/02, F16f 15/02
[58] Field of Search.................. 331;94.5/; 330/4.3; 248/26, 146, 20, 21, 358 R; 350/295

[56] References Cited
UNITED STATES PATENTS
| | | | |
|---|---|---|---|
| 3,768,765 | 10/1973 | Breckenridge, Jr. | 248/146 |
| 3,784,146 | 1/1974 | Matthews | 248/358 R |
| 3,808,553 | 4/1974 | Locke et al. | 331/94.5 D |

Primary Examiner—Robert J. Webster
Assistant Examiner—R. J. Webster
Attorney, Agent, or Firm—Anthony J. Criso

[57] ABSTRACT

The construction of a stable platform for the optics in a convective gas laser system is disclosed. The laser which is excited with an electric discharge and has a relatively long optical pathlength is fitted into a package substantially shorter than the optical path with folding mirrors fixed to two optical platform assemblies. An optical platform housing forms a gas tight enclosure around each optical platform assembly. A rigid optics truss ties the platform assemblies into a single optical structure which is insensitive to temperature variation, resists mechanical distortion and is vibrationally insulated from the rest of the laser system and ground. The support for the optical structure as well as the construction details of the optical platform assemblies are discussed. The techniques used to allow the optical platform to penetrate the platform housing while maintaining a gas tight seal, providing electrical isolation to the internal optical bench, and avoiding the transfer of vibrations to the platform are also discussed.

6 Claims, 4 Drawing Figures

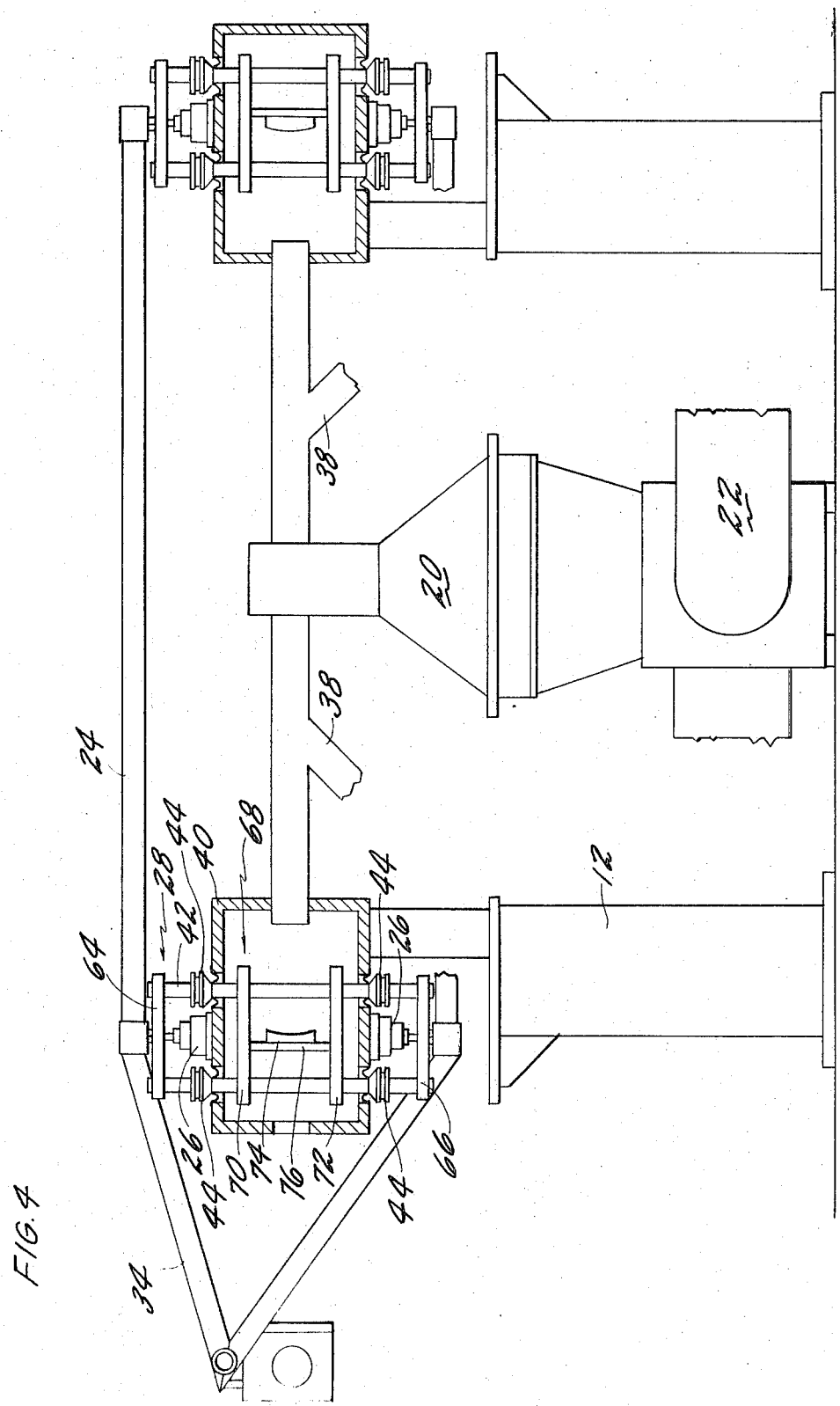

STABLE PLATFORM STRUCTURE FOR LASER OPTICS

BACKGROUND OF THE INVENTION

1. Field of Invention

The present invention relates to laser and more particularly to a laser structure in which the optics are rigidly supported and simultaneously insulated from surrounding disturbances.

2. Description of the Prior Art

The proper operation of many laser devices requires satisfying the unsophisticated sounding but essential requirements of providing a rigid optical platform for precise alignment of the optical surfaces and isolating the components which form the optical structure of the laser from various disturbances in the surrounding environment. All gas laser systems have a requirement for an optical platform which coordinates the various optics comprising the optical cavity. Several alternate design approaches have been considered for suitable optical platforms and each has both desirable and undesirable inherent characteristics. In one design, the entire apparatus is located inside the working medium enclosure of the laser, however, such a system requires a disproportionately large volume of the working medium. Another drawback is the difficulty involved in electrically isolating the optical platform which is often required. In an alternate design, the entire platform is located external to the low pressure working medium environment of the laser; this approach implies that all the optical components are external to the enclosure containing the working medium and therefore suitable window devices which permit the optical surfaces to communicate with the working medium while simultaneously maintaining a suitable isolation between the active medium and the surrounding environment are required. The idea is conceptually simple but somewhat impractical in many applications because of the unavailability of suitable window devices. A third optical platform design is based on the use of a rigid structure to interconnect the platforms holding the optical surfaces, the rigid structure being external to the low pressure working medium environment and the optical surfaces being immersed in the low pressure environment. This design suffers the disadvantage of distorting pressure forces on the optical platforms due to the pressure differential between the surrounding environment and the envelope containing the working medium thereby exposing the optical system to misaligning distortion. This approach also must satisfy the requirements of electrical isolation of the optical surfaces from the surrounding structural members and isolation of the optics from mechanical disturbances, the latter being the result of either vibrations transmitted to the optics or thermally induced variations.

Mechanical disturbances can include vibrations which originate in sources such as the auxiliary equipment used in support of the laser. A primary source of this type vibration is the circulator which maintains a flow of the working medium through the optical cavity in a convection laser. Other sources of spurious vibrations are the motion of the working fluid and the natural vibrations found in the earth in the buildings which house the laser. The frequency and intensity of vibrations from these sources vary considerably depending upon the flow velocity and the geographic location and particular type of construction involved.

Some lasers are operated with little regard to the effect of disturbances from the surrounding environment. Nonflowing devices similar to those which are frequently found in a laboratory can be in this category. Other systems which simply do not experience a troublesome amount of change in the optical alignment such as lasers producing an output, the frequency of which can be permitted to vary considerably, fall into this category. However, many practical applications require that the frequency of the output radiation from a laser be maintained within limits which require means for isolating the generating optics of the system from disturbances present in the immediately surrounding environment. Also, as lasers become more sophisticated, the cavity optics become correspondingly more complex and folded path lasers, for example, in which the effective cavity length is many times longer than the actual length of the device present special additional problems. If the spacing between the mirrors forming the cavity changes or if the relative alignment between the mirrors changes, the output beam can become distorted or the laser may even fail to resonate.

SUMMARY OF THE INVENTION

An object of the present invention is to maintain a precise relative alignment amongst all the optics at each end of a linear laser device so that the stimulated emission occurs in a stable mode. Another object is to maintain a suitable optical alignment between the various reflecting surfaces forming a folded optical path in the laser by minimizing the mechanical distortions and vibrations in the structure supporting the reflecting surfaces.

Further objects are to maintain the phase front and intensity distribution of the output beam stable for an essentially indefinite operational period, and to maintain an essentially constant angular alignment between the various reflecting surfaces forming the folded optical path in the laser.

According to the present invention a pair of optical platforms which support the reflecting surfaces forming a folded path laser in a gas enclosure are mechanically interconnected by a temperature insensitive rigid structure, the structure being external to the gas enclosure and supported from ground by the enclosure apparatus, and together with the optical platforms is electrically and vibrationally insulated from both the gas enclosure and ground.

An advantage of the present invention is the high optical quality of the beam of output radiation from the system; the beam has a stable phase front and a uniform phase front which is essentially constant with time. Another advantage is the high degree of stability which the output beam has with respect to the rigid optical structure of the laser.

A feature of the present invention is the rigid structure which integrates the mirrors and optical platforms into a single stable unit. The optics structure maintains its rigidity while being subjected to a differential pressure which exists between the optical cavity and the surrounding environment, the temperature variation which invariably occur at various locations on the structure, and vibrations present in the auxiliary equipment and surrounding environment. Further, the internal optics of the laser are supported with a structural arrangement whereby a reasonably precise alignment can be maintained between the optics and the surrounding structure. The truss structure which interconnects the optical platforms is external to the working medium region while the optics remain immersed in the working medium. In addition, the optical support system is constructed of a low thermal expansion material to minimize thermally induced distortions of the structure. Also, the primary components of the gas enclosure as well as the connection rods in the optical platforms are constructed of a dielectric material thereby providing electrical insulation of the external structure from both the reflecting surfaces and the working medium. Another feature of this invention is the optical support means which are physically symmetric to preclude a loading of the optical bench due to the low pressure of the working medium; further, the center of mass for each optical platform is approximately coincident with the geometric center of the platform array. In addition, the entire rigid optical structure is supported from the optical housing by vibration mounts whereby the support structure can undergo physical distortion due to twisting and thermal expansion without disturbing the optical structure.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 4 is a simplified schematic side elevation of the present invention showing the essence of the isolated optical platform structure and the means supporting it from the surrounding structure.

DESCRIPTION OF A PREFERRED EMBODIMENT

The present invention is discussed herein in terms of an axial flow laser system employing a gas such as carbon dioxide as the working medium.

Figure 1:
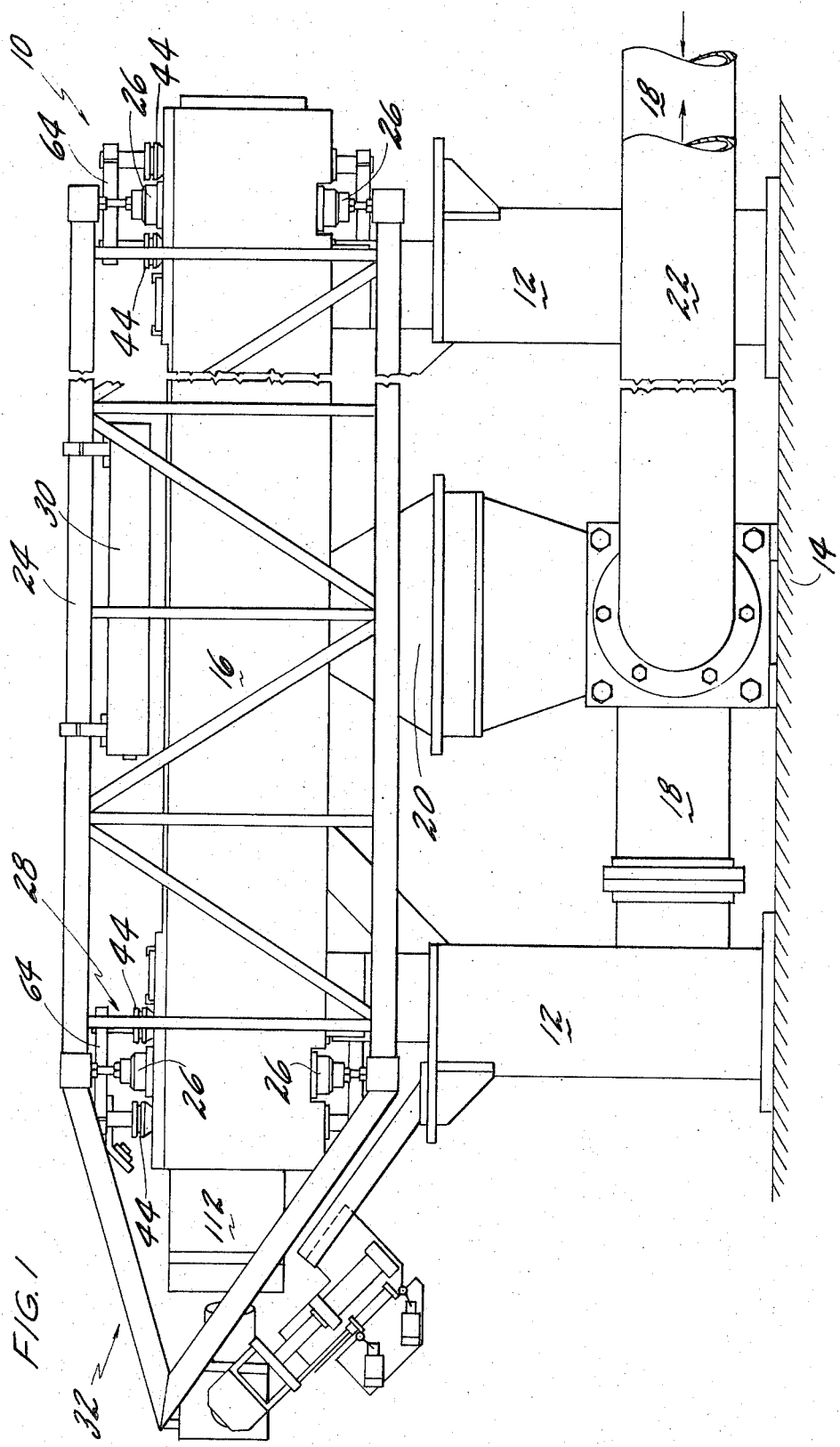
FIG. 1 is a simplified side elevation of the present invention showing various detailed structure and the relative positioning of some of the components.

Referring to FIG. 1, an electric discharge gas laser 10 is shown. A pair of support legs 12 rest on ground 14 and are fixedly attached to an optics box 16. A gas supply pipe 18 is rigidly connected to both ends of the optics box; a discharge plenum 20 is fixedly attached to the center of the optics box and empties into a gas discharge pipe 22 which is in the same horizontal plane as the supply pipe. An optical platform truss 24 is supported from the optics box by vibration mount 26 and a pair of optical platform assemblies 28 are fixedly attached to the optical truss. An alignment device 30 is fixedly attached to the truss and an external optics assembly 32 is fixedly attached to a support which extends from the optics truss.

Figure 2:
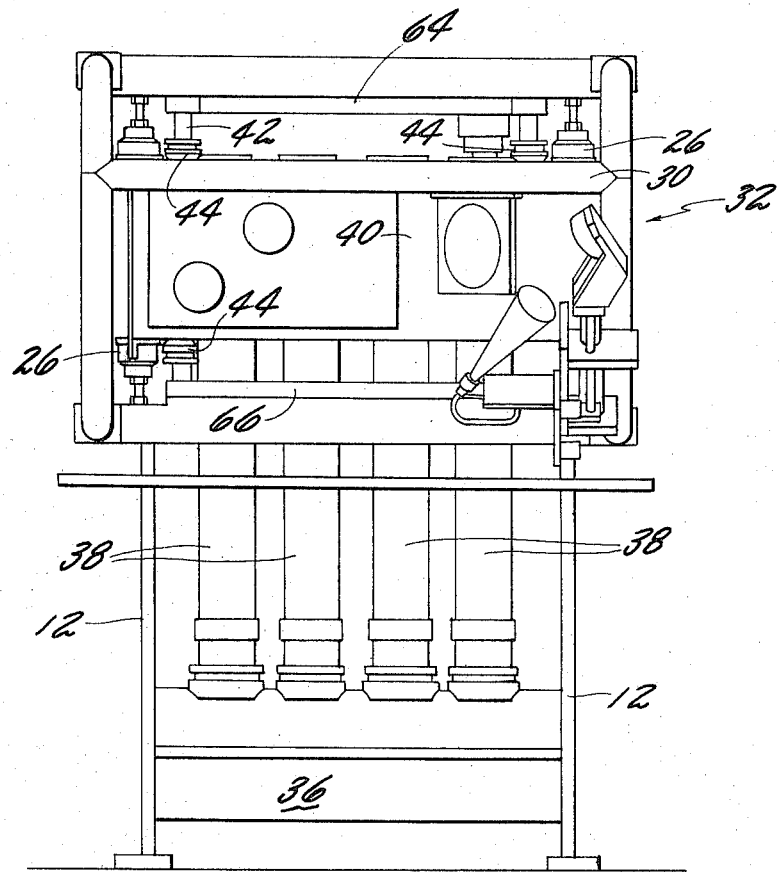
FIG. 2 is a simplified end elevation of the apparatus shown in FIG. 1.

The supply pipe includes a pair of end inlet manifolds 36, one of which appears in the simplified end elevation of the apparatus shown in FIG. 2. A plurality of electric discharge tubes 38 extend between the end manifolds and the optics box which has an optical platform housing 40 at each end in the vicinity of each optical platform assembly. Electrode means which are electrically connected to a source of electric power are positioned in the discharge tube and provide a means for exciting the laser gas; the power source is not shown in the drawing. A plurality of connection rods 42 which form an essential part of the optical platform assemblies penetrates the optical platform housing with flexible seals 44 forming a gas tight barrier where each rod penetrates the housing.

Figure 3:
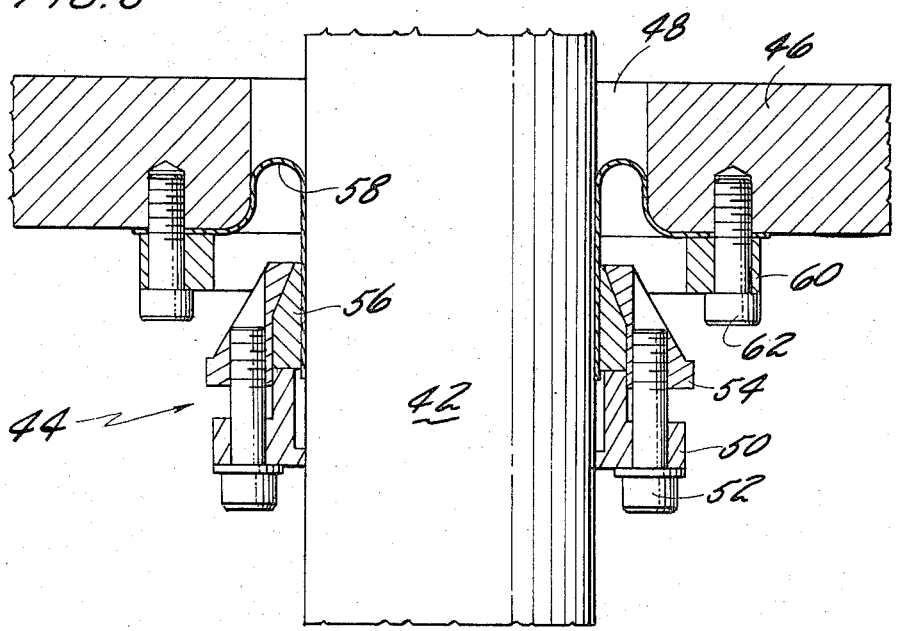
FIG. 3 is a partial sectional elevation through an end box showing the details of the connection rod seal.

In FIG. 3, the manner in which the connection rod penetrates an optical platform housing is shown in greater detail. The housings are made of a dielectric material to avoid electrical shorting between the working medium and the surrounding structure. A lower housing plate 46 of the housing has a hole therethrough large enough to receive a connection rod and provide an annular space 48 between the rod and the plate. An annular rim 50 is removably connected by adjusting bolt 52 to a sliding wedge ring 54 which interfaces with a fixed wedge ring 56. The inner circumference of an annular elastomeric diaphragm 58 is interposed between the fixed wedge ring and the rod; the outer circumference of the annular diaphragm is interposed between a housing ring bolt 60 and the housing lower plate, the former being attached to the latter with housing bolts 62.

The components forming the optical platform structure which is mechanically isolated from the support structure are shown in simplified sketch in FIG. 4. The interconnecting structural members in the optical platform 28 are the connection rods 42. Each platform assembly includes four rods; an upper platform assembly plate 64 and a lower platform assembly plate 66 are bolted to these rods, the plates being external to the optical platform housing and fixedly attached to the platform truss. The upper and lower platform plates are connected to and supported from the optical platform housing by four of the vibration mounts 26. In a region internal to the optical platform housing, an internal optics bench 68 comprising an upper bench plate 70 and a lower bench plate 72 and a backing plate 76 is rigidly bolted to the four connected rods which penetrate the optical platform housing and constitute primary structural members in the optical platform assembly; reflecting means 74 are fixedly attached to the backing plate. The upper and lower bench plates and the backing plate are fixedly joined forming the internal bench upon which all the internal optics are mounted.

The seal 44 which is shown in detail in FIG. 3 form a flexible joint between the rods and the platform housing at each of the eight locations where a continuous rod penetrates the optical platform housing. The seals are impervious to gas and can operate with a pressure differential which is typically up to approximately one atmosphere. The seals serve to maintain the integrity of the atmosphere internal of the housing and also to insulate the platform assembly from mechanical distortions and other disturbances present in the platform housings.

The fixed structure which is subject to vibrational disturbances present in the ground and surrounding environment of the apparatus shown in FIG. 4 includes the support legs 12, the optical platform housing 40, the discharge tube 38, the discharge plenum 20 and the discharge pipe 22. The components of the system which are insulated from the various influences of the environment and constitute a rigid and relatively vibration free structure which essentially floats with respect to the supporting apparatus includes the optical platform assemblies 28, the optical truss 24 which interconnects the platform assemblies and the support 34.

Compressive forces are transmitted to the connection rods due to the annular space 48 between the rods and the platform housings and the pressure difference across the diaphragm in the seal. These forces which are sometimes referred to as vacuum forces can be made quite small by minimizing the size of the annular space, however, there are practical considerations which suggest that the annular space not be reduced too much. In the present invention, the main axis of each rod is essentially normal to the optical axis of the system and to a first approximation, any mechanical deformation associated with the vacuum forces does not cause angular misalignment of the mirrors supported by the rods. The rods have great strength in compression and the axial compressive load which they experience is readily absorbed in the rods with no apparent physical distortion. Since there is no net force on the connecting rods, the optical platforms remain absolutely fixed with respect to the optics truss over a wide range of pressure conditions. As is apparent from the drawing, the connection rods are of constant area throughout their entire length and they penetrate both the top and the bottom of the optical platform housings. The openings in the housing through which the rods pass have the identical area at both top and bottom to ensure that the loading applied to the rods as a result of the differential pressure between the environment and the optical cavity is symmetric. The rods are made of a low expansion electrically insulating material such as alumina or quartz thereby allowing the optical platforms to be electrically floating with respect to the upper and lower connecting plates which are rigidly attached to the optics truss.

Essentially, all of the metallic optical components including the optical platforms and the optics truss are fabricated of a material such as invar which is relatively insensitive to temperature variations. This minimizes the relative motion between various portions of the optical system which are invariably subjected to various thermal conditions during normal operation. The reflecting surfaces or mirrors themselves are made of a material selected primarily for heat transfer and optical criteria. For additional information on a typical cooling mirror construction applicable to the present invention see, for example, U.S. Pat. No. 3,637,296, McLafferty et al., "Cooling Means for Reflecting Device."

Although this invention has been shown and described with respect to a preferred embodiment thereof, it should be understood by those skilled in the art that various changes and omissions in the form and detail thereof may be made without departing from the spirit and scope of the invention.

Having thus described a typical embodiment of our invention, that which we claim as new and desire to secure by Letters Patent of the United States is:

1. In a gas laser system of the apparatus comprising:
   a first and a second enclosed optical platform housing cooperatively disposed at opposite ends of the laser system and fixedly joined to one another;
   a first and a second support leg each of which is fixedly joined to a corresponding first and second optical platform housing, the support legs extending from the housing to a reference ground;
   a first and second optical platform assembly each of which penetrates the close of a corresponding platform housing, each platform assembly comprising:
      an upper and a lower platform assembly plate;
      a plurality of connection rods each of which has a first and a second end and passes completely through the platform housing, the rods being fixedly attached near the first end to the upper platform plate and fixedly attached near the second end of the lower platform;
      an optical bench internal to the platform housing and fixedly attached to the rods; and
      reflection surfaces fixedly joined to the optical bench;
   an optical platform truss which is fixedly attached to the first and the second optical platform assemblies to form a rigid optical structure; and
   a plurality of vibration mounts interposed between the optical structure and the optical platform housings to support the optical structure while simultaneously insulating the optical structure from disturbances in the platform housings.

2. The invention according to claim 1 including further a plurality of flexible seals, one at each location at which a connection rod passes through a platform housing, each seal having an elastomeric diaphragm which forms a gas impervious barrier between the rod and the housing.

3. The invention according to claim 2 including further an external optics assembly which is fixedly attached to the optical platform truss and is external to the optical platform housing.

4. The invention according to claim 3 wherein the rigid optical structure is formed of invar material.

5. The invention according to claim 4 wherein the optical platform housings are constructed of a dielectric material.

6. The invention according to claim 5 wherein the connection rods are formed of a dielectric material.

* * * * *

PO-1050
(5/69)

UNITED STATES PATENT OFFICE
CERTIFICATE OF CORRECTION

Patent No. 3,860,889            Dated January 14, 1975

Inventor(s) ANTONIO B. CARUOLO and JACK W. DAVIS

It is certified that error appears in the above-identified patent and that said Letters Patent are hereby corrected as shown below:

| | |
|---|---|
| Column 1, line 5 | change "laser" to -- lasers -- |
| Column 6, line 6 | delete "of" |
| Column 6, line 23 | change "of" to -- to -- |

Signed and sealed this 1st day of April 1975.

(SEAL)
Attest:

RUTH C. MASON
Attesting Officer

C. MARSHALL DANN
Commissioner of Patents
and Trademarks